United States Patent [19]

Voisin

[11] Patent Number: 5,172,056

[45] Date of Patent: Dec. 15, 1992

[54] MAGNETIC FIELD TRANSMITTER AND RECEIVE USING HELMHOLTZ COILS FOR DETECTING OBJECT POSITION AND ORIENTATION

[75] Inventor: Gérard Voisin, Gironde, France

[73] Assignee: Sextant Avionique, France

[21] Appl. No.: 740,010

[22] Filed: Aug. 2, 1991

[30] Foreign Application Priority Data

Aug. 3, 1990 [FR] France .................. 90 09955

[51] Int. Cl.$^5$ .................................................. G07B 7/14
[52] U.S. Cl. ......................... 324/207.17; 324/226; 324/228; 324/247; 89/41.19
[58] Field of Search ............ 324/207.16, 207.17, 324/239, 226, 262, 207.26; 343/742, 867; 89/41.19, 41.21

[56] References Cited

U.S. PATENT DOCUMENTS

| | | | |
|---|---|---|---|
| 3,439,256 | 4/1969 | Kähne | 324/207.17 X |
| 3,800,213 | 3/1974 | Rorden | 324/252 X |
| 4,244,120 | 1/1981 | Harris | 434/59 |
| 4,287,809 | 9/1981 | Egli et al. | 324/260 |
| 4,314,251 | 2/1982 | Raab | 324/207.24 X |
| 4,396,885 | 8/1983 | Constant | 324/207.17 |
| 4,642,786 | 2/1987 | Hansen | 324/207.17 X |
| 4,829,250 | 5/1989 | Rotier | 324/207.17 X |
| 4,849,692 | 7/1989 | Blood | 324/207.17 X |
| 4,945,305 | 7/1990 | Blood | 324/207.17 |
| 5,047,715 | 9/1991 | Morgenstern | 324/207.17 |

Primary Examiner—Gerard R. Strecker
Assistant Examiner—Warren S. Edmonds
Attorney, Agent, or Firm—Rosenman & Colin

[57] ABSTRACT

The radiator and the sensor each comprise three pairs of Helmholtz coils which are disposed along three orthogonal axes respectively. The coils are wound in pairs of grooves which have different depths and are recessed in a cubic support. The radiator and sensor are particularly useful for helmet-type viewfinders.

15 Claims, 5 Drawing Sheets

MAGNETIC FIELD TRANSMITTER AND RECEIVE USING HELMHOLTZ COILS FOR DETECTING OBJECT POSITION AND ORIENTATION

BACKGROUND OF THE INVENTION

The principle of electromagnetic position detection is well known for determining the position and orientation of a solid moving body with a reference mark. One of the applications of this principle is the determination of the direction of sight of a helmet-type viewfinder which an infantry soldier, an operator, a tank driver or aircraft pilot puts on his head to control a weapon, missile, or navigation camera, for example.

This principle of detection uses a magnetic field transmitter or radiator, which is connected to the reference mark or reference frame in which the measurements are carried out, a magnetic field receiver or sensor, which is fixed to the moving body whose position and orientation are to be determined, and electronic processing circuits including analog amplifiers, a computer and processing algorithms.

The radiator must satisfy the conditions of dipole theory, in which the system of coordinates for the mathematical description of the radiation is a sphere centered on a dipole, and the Green function of free space depends only on the radial coordinate.

The magnetic field sensor must be as point-like as possible. The transmitter radiates a field, either sequentially or by multiplexing, along two or three orthogonal axes and the sensor detects sequentially the components of this field along three or two orthogonal axes, transmission and reception each generally being effected along three axes. The sensor thus provides, by way of the transmission axis, three measurements, that is to say a total of nine, which are organized into a 3×3 matrix, using the processing algorithms which provide the position and orientation of the sensor with respect to the radiator.

It should be noted at this point that the determination of the position and orientation of the sensor implies the determination of six variables—the three Cartesian coordinates, the relative bearing, the elevation angle and the roll—and that at least six measurements are thus necessary. If transmission is only effected along two axes, reception must consequently be effected along three, and vice versa.

FR-A-2 458 838/7914441 describes a system for implementing the principle of electromagnetic position detection. It could usefully be noted above all that the Applicants intend to consider this document as an integral part of the present application. Schematically, the radiator and the sensor each comprise a group of identical current-controlled identical coils which are disposed along the three orthogonal axes respectively. In order to best combine the conditions of the dipole both for the radiator and for the sensor, the dimensions of the coils should be as small as possible. It is also of interest, still with the same aim, to replace each coil by three half coils through which the same current flows. It could also be considered to have as the radiator and sensor a sphere made of magnetic material surrounded by three orthogonal coils.

In fact, in the previously implemented systems for electromagnetic position detection, the radiators and sensors have not fully met the conditions of the dipole theory and the object of the present invention is to come closer to them.

SUMMARY OF THE INVENTION

It is clear that it is not possible to have electromagnetic position detection without one or the other of the two elements of the radiator/sensor pair. One does not function without the other. However, it would be perfectly possible to offer one for sale without the other. This invention relates to a new radiator and a new sensor separately. This separation, which thus assumes certain importance juristically, is more formal than fundamental, since, as will become clear below, the new radiator and the new sensor of the invention are connected by a unique inventive concept.

THE SENSOR

In a predetermined reference frame, the magnetic field is represented at a given point by a vector $\vec{H}$. In this reference frame, the axes of sensitivity of the sensor are represented by a vector $\vec{C}$. The results of measurements carried out by the sensor may be disposed in the form of a matrix M corresponding to the scalar product $\vec{C} \cdot \vec{H}$ $$\vec{C} \cdot \vec{H} = C^T H = M$$

H being the matrix of the field and $C^T$ being the transposed matrix of the matrix C of the axes of sensitivity of the sensor.

In the reference frame, the sensor may be subjected either to translation or to rotation. Let us consider the latter as expressed by a matrix of rotation R. The matrix of the axes of sensitivity of the sensor becomes RC and that of the measurements, $M_R$.

$$M_R = C^T R^T H$$

If the three axes of the sensor are orthonormed, $$C = \begin{pmatrix} 1 & 0 & 0 \\ 0 & 1 & 0 \\ 0 & 0 & 1 \end{pmatrix} = (1)$$

Consequently, $$M_R = R^T H$$

H being dependent on the position of the sensor and $M_R$ on its position and orientation.

In the presence of magnetic perturbation, for example caused by the metallic masses of an airplane, the processing algorithms rest on cartographic bearings. In order to obtain this preliminary cartography, the field is measured by the sensor at multiple points in space to which are thus associated matrices of perturbed measurements. Let $M_C$ be one of the latter. If the sensor is subjected to a rotation R, the measurement matrix should be $$M_R = R^T M_C$$
$$M_R^T = M_C^T R$$
$$M_R^T M_R = M_C^T R R^T M_C$$
$$= M_C^T M_C$$

The matrix product $M_R^T M_R$ is thus rotation-invariant and representative of the point under consideration.

The cartography is intended to determine the function f of correspondence between $M_C$ and $M_C^T M_C$.

During subsequent measurements, the product $M_R^T M_R$ corresponds to a matrix $M_R$.

As $M_R^T M_R = M_C^T M_C$, $M_C$ is derived by the function f, thus the position of the sensor. In order to determine the matrix of rotation R, that is the orientation of the sensor axes, knowing $M_R$ and $M_C$, R is calculated using the equation $M_R = R^T M_C$, that is to say $$R = M_C M_R^{-1}$$

The algorithm developed above is thus based on the rotation-invariance of $M^T M$. In reality, this invariance is only verified for a perfectly point-like sensor, which has never previously been proposed.

In a quite surprising manner, the Applicants have established that a magnetic sensor for determining the position and orientation of a moving body, comprising at least two pairs of coils disposed respectively along two orthogonal reception axes, characterized by the fact that the coils of each pair are Helmholtz coils, best meets the conditions of the dipole theory.

It should be pointed out that the said Helmholtz coils are two coils with circular turns, having the same average radius, which extend respectively in two parallel planes spaced from one another by a distance which is equal to the radius of the turns of the coils, the number of turns of each coil giving it a small thickness compared to its diameter.

The present invention is thus an unexpected application of Helmholtz coils.

On the basis of equivalence with an antenna, between transmission and reception, the Applicants have carried out two tests which show in full the scope of the invention.

For a plurality of identical coil pairs having one turn each, in two fixed parallel planes and having different diameters $\phi$, the Applicants have calculated the relative errors between the magnetic fields actually produced $\vec{H}_p$ by these pairs of turns used for transmission at a predetermined fixed distance and the theoretical fields $\vec{H}_D$ produced at the same distance by a dipole placed at the same location as these coils and calculated in a conventional manner as a function of an angle of relative bearing a varying from 0 to 90 degrees.

The first test related to the errors.

$$\epsilon_m = \frac{|\vec{H}_p| - |\vec{H}_D|}{|\vec{H}_D|}$$

of the field modulus and is illustrated in FIG. 1 by the bundle of curves relating to pairs of turns having increasing diameters with the ordinates to the right of the point [$\epsilon_m = 0$, $\alpha = 45$ degrees], which is a point of intersection of all the curves of the bundle. One of the curves of the bundle coincides substantially with the zero ordinate line $\epsilon_m = 0$ and corresponds to the Helmholtz conditions.

The second test related to angular errors $\delta$ of field orientation and is illustrated in FIG. 2 by the bundle of curves relating to pairs of turns of increasing diameter with the ordinates and which all extend between the points [$\delta = 0$, $\alpha = 0$ degrees] and [$\delta = 0$, $\alpha = 90$ degrees]. The curve corresponding to the Helmholtz conditions again coincides with the straight line $\delta = 0$.

Each coil of the sensor of the invention advantageously comprises a plurality of turns and the central turns of the coils of each pair satisfy the Helmholtz conditions.

In this case, the diameter of the turns of the coils of one pair may be sufficiently small and the number of turns for maintaining good sensitivity sufficiently large for these coils to be adjacent and to form only one single coil.

The Radiator

The specific problem posed by magnetic radiators is that of their interchangeability, to which frequent recourse has to be made. Changing the radiator normally implies using new cartographic bearings. The making of a cartography is a particularly long operation which may last several days.

The Applicants have thus sought to overcome this difficulty and to permit one radiator to be replaced by another without having to work out a new cartography.

Keeping the cartography of one radiator for another would imply that the two radiators can emit identical fields and that the transmitters are therefore as point-like as possible.

The Applicants have established that a magnetic radiator for determining the position and orientation of a moving body, comprising at least two pairs of coils disposed respectively along two orthogonal transmission axes, characterized by the fact that the coils of each pair are Helmholtz coils, enables this problem to be solved.

In fact, thanks to the point-likeness of the radiator, a difference in orientation between fields produced by two interchanged radiators may be easily corrected by mixing the transmissions along the axes of the new radiator, the optimum being achieved if the radiator has three orthogonal axes of transmission. It will be noted that the mixture of transmission along the axes of the radiator does not pose any difficulty because the transmissions in the three axes are effected one after the other.

Thus, the essential characteristics of the sensor and the radiator of the invention are the same and it is in this sense that it was stated above that they originate from a unique inventive concept.

Of course, the tests described with respect to the sensor of the invention can also be applied to the radiator of the invention.

As far as their diameters and the number of their turns are concerned, the coils of the radiator of the invention may of course have the same characteristics of those of the sensor of the invention.

BRIEF DESCRIPTION OF THE DRAWINGS

The invention will be better understood from the following description of the radiator and the sensor of the invention with reference to the attached drawings, in which.

DETAILED DESCRIPTION OF THE PREFERRED EMBODIMENTS

Figure 4:
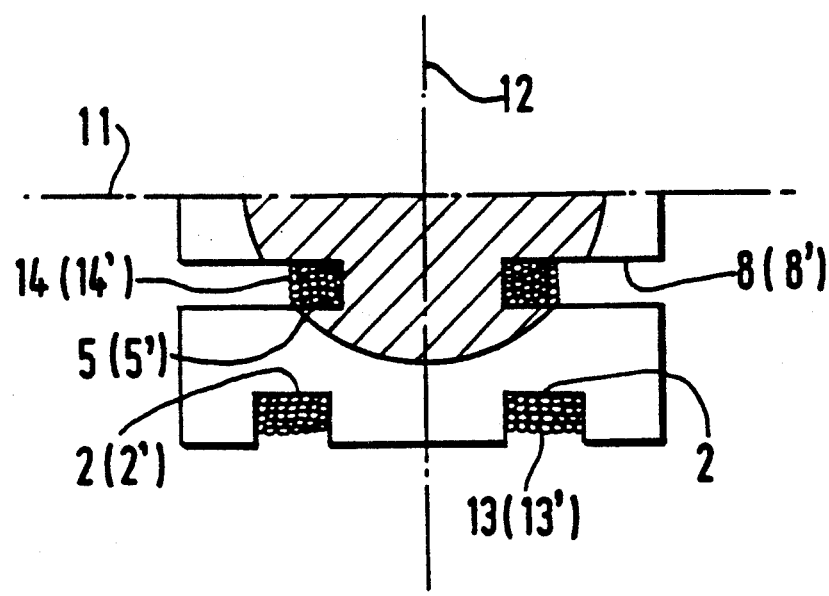
FIG. 4 is a half view in section of the radiator of FIG. 3.
Figure 5:
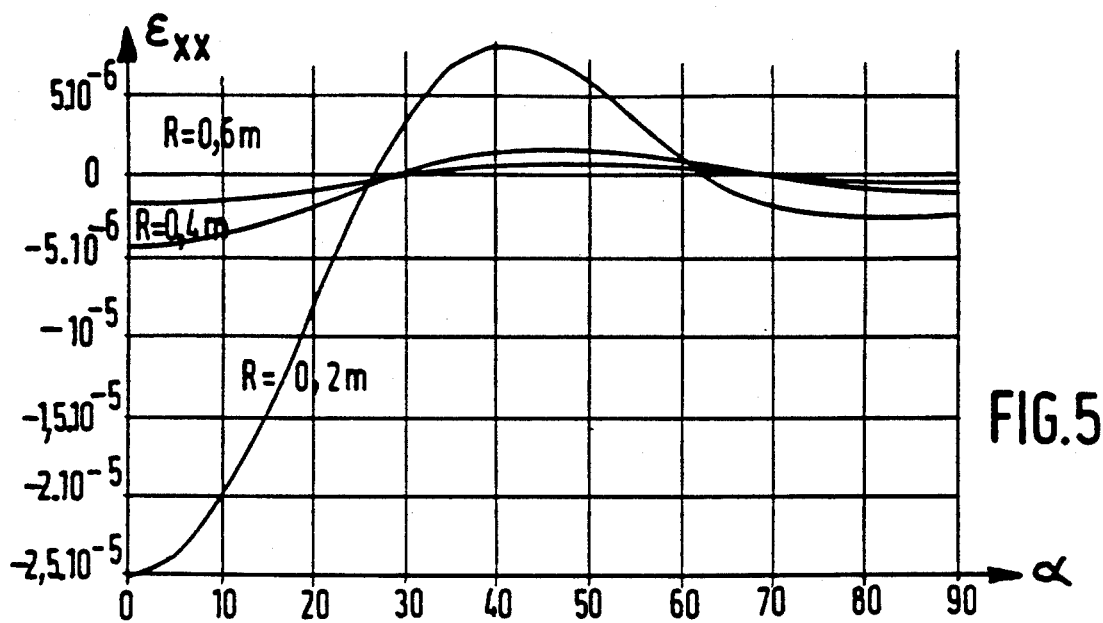
FIG. 5 shows the curves representing the relative error of the field modulus at three different distances as a function of the relative bearing, produced by the first pair of coils of the Ox axis along said Ox axis of the radiator of FIG. 3, in relation to the field of a dipole.
Figure 6:
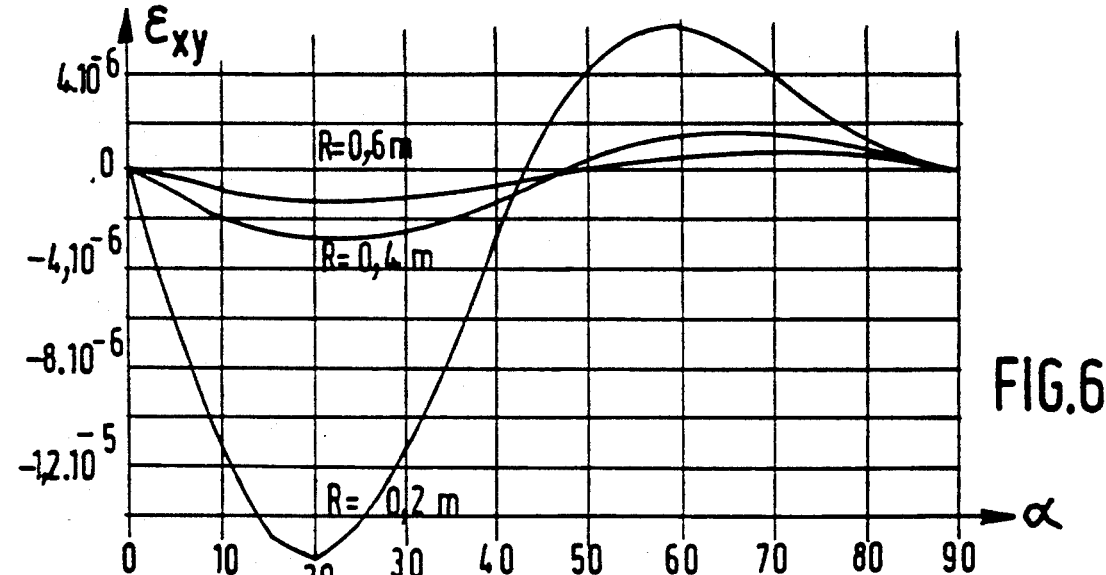
FIG. 6 shows the curves representing the relative error of the field modulus at three different distances as a function of the relative bearing, produced by the first pair of coils of the Ox axis along the Oy axis of the radiator of FIG. 3, in relation to the field of the dipole.
Figure 7:
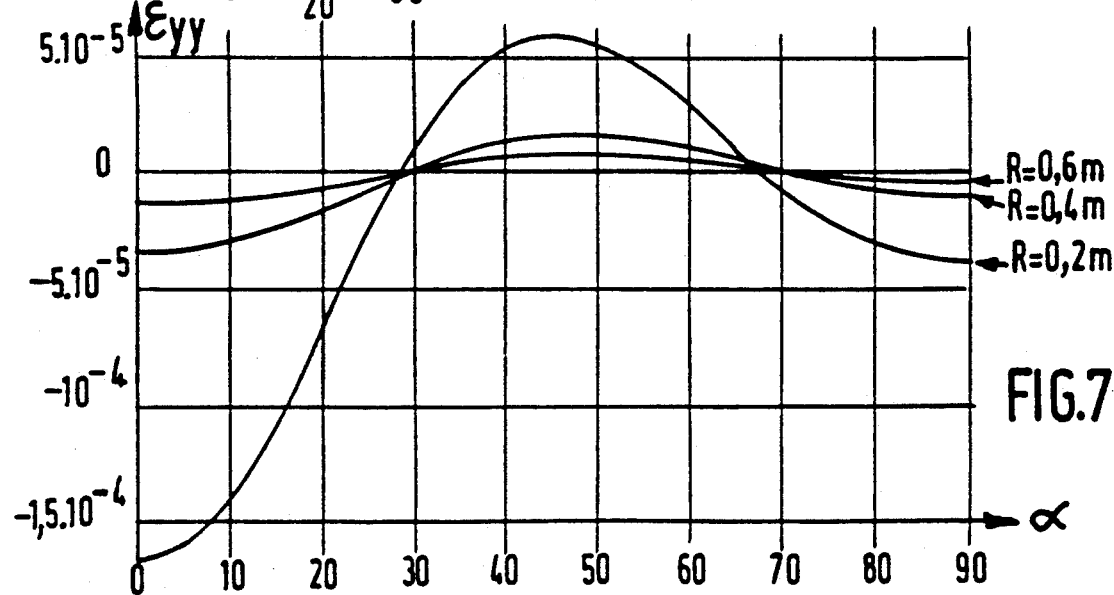
FIG. 7 shows the curves representing the relative error of the field modulus at three different distances as a function of the relative bearing, produced by the second pair of coils of the Oy axis along said Oy axis of the radiator of FIG. 3, in relation to the field of a dipole.
Figure 8:
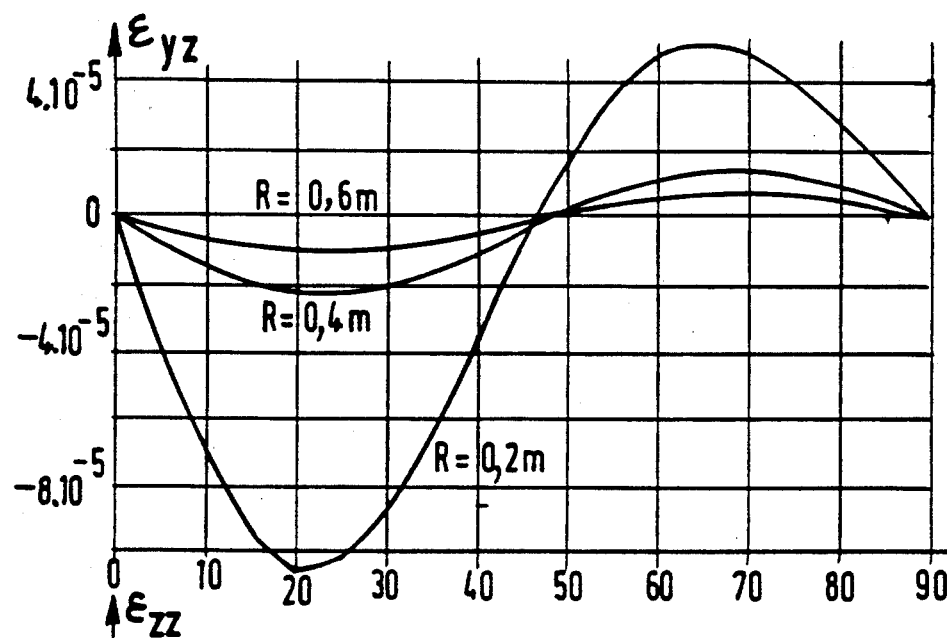
FIG. 8 shows the curves representing the relative error of the field modulus at three different distances as a function of the relative bearing, produced by the second pair of coils of the Oy axis along the Ox axis of the radiator of FIG. 3, in relation to the field of the dipole.
Figure 9:
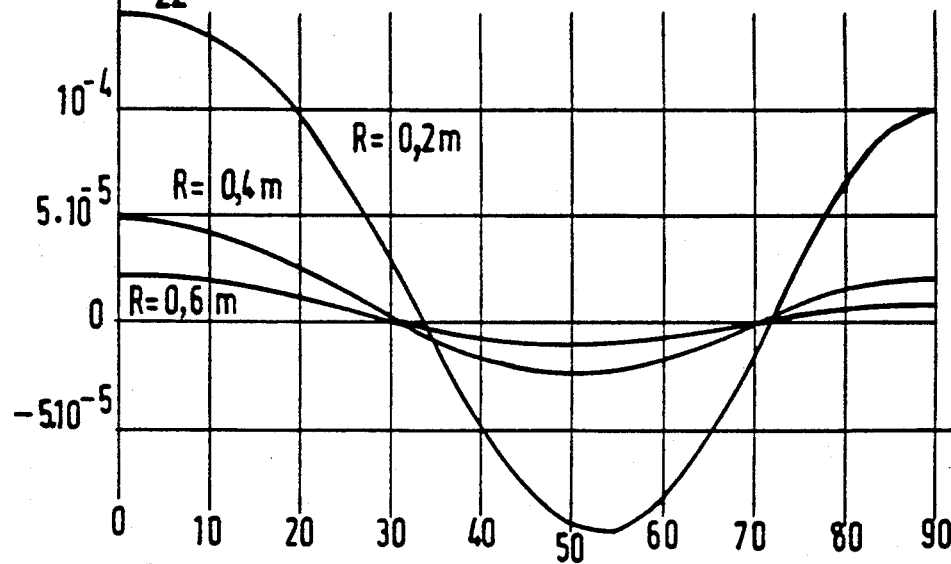
FIG. 9 shows the curves representing the relative error of the field modulus at three different distances as a function of the relative bearing, produced by the third pair of coils of the Oz axis along said Oz axis of the radiator of FIG. 3, in relation to the field of a dipole.
Figure 10:
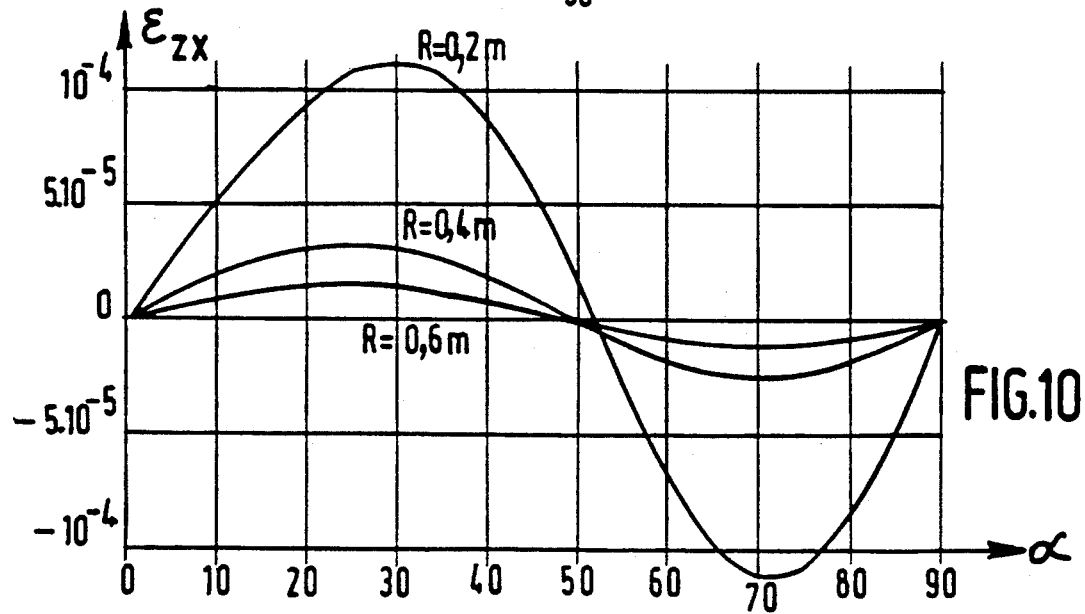
FIG. 10 shows the curves representing the relative error of the field modulus at three different distances as a function of the relative bearing, produced by the third pair of coils of the Oz axis along the Ox axis of the radiator of FIG. 3, in relation to the field of the dipole.

The radiator of FIG. 4 comprises three pairs of Helmholtz coils on a parallelepiped support, in this case a cubic support, 1 made of a non-magnetic and non-conductive material. The pairs of coils are imbricated one inside the other and each pair has a different diameter. A cube has been used in this case for reasons of simplicity, but it is its characteristic of having three orthogonal axes of symmetry which is the determining factor.

The coils of the three pairs of coils are wound in three pairs of grooves which are parallel in pairs and recessed in parallel in three planes of symmetry of the cube 1, and have three different depths. In this case, the grooves have a rectangular section parallel to their axis.

The cube 1 comprises a first pair of grooves 2 which are spaced along a first axis 3 which is perpendicular to the medial planes of the grooves and to the face 4 of the cube and which passes through the centre of the cube. The grooves 2 are symmetrical with respect to the plane of symmetry 12 of the cube. The cube 1 comprises a second pair of grooves 5 spaced along a second axis 6 which is perpendicular to the axis 3, the medical planes of the grooves 5 and the face 7 of the cube and which passes through the centre of the cube. The grooves 5 are deeper than the grooves 2. These grooves 5 are symmetrical with respect to the plane of symmetry of the cube parallel to the face 7.

Figure 1:
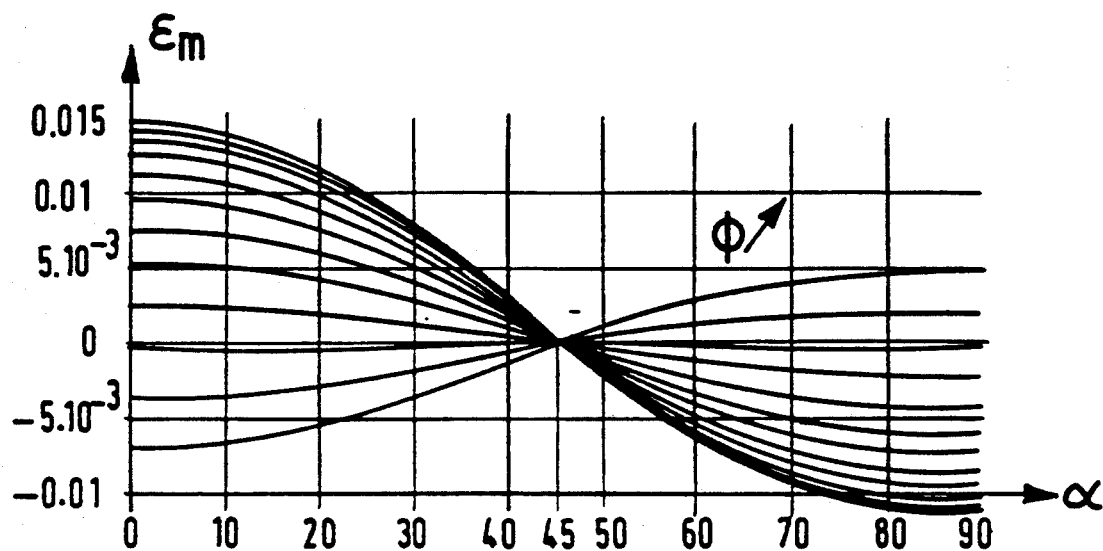
FIG. 1 shows a bundle of curves representing the error of the magnetic field modulus as a function of the relative bearing, at a predetermined distance from a pair of turns having different diameters, in relation to the field produced by a dipole.
Figure 2:
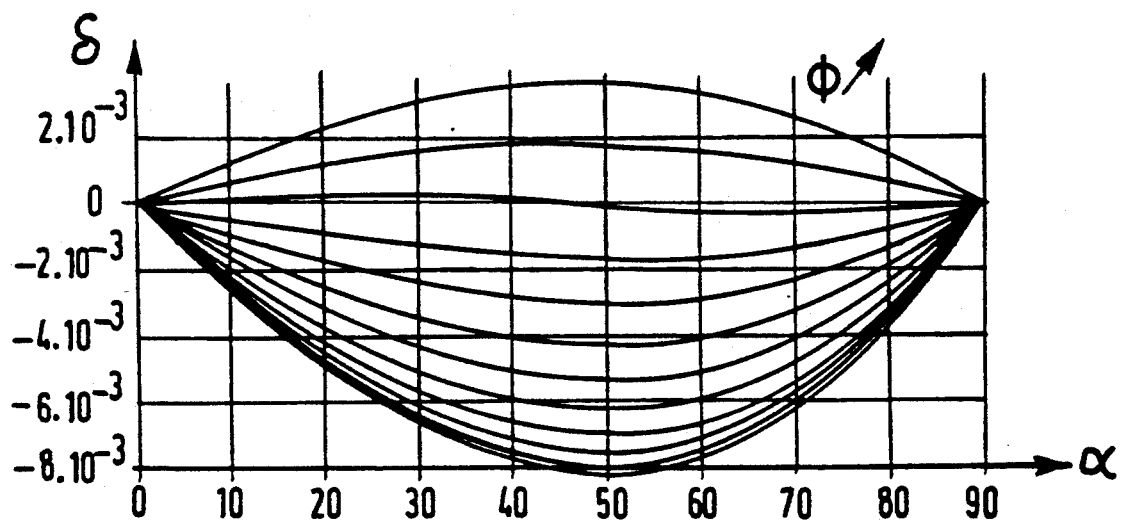
FIG. 2 shows a bundle of curves representing the angular error of orientation of the magnetic field as a function of the relative bearing, at a predetermined distance from a pair of turns having different diameters, in relation to the field produced by a dipole.
Figure 3:
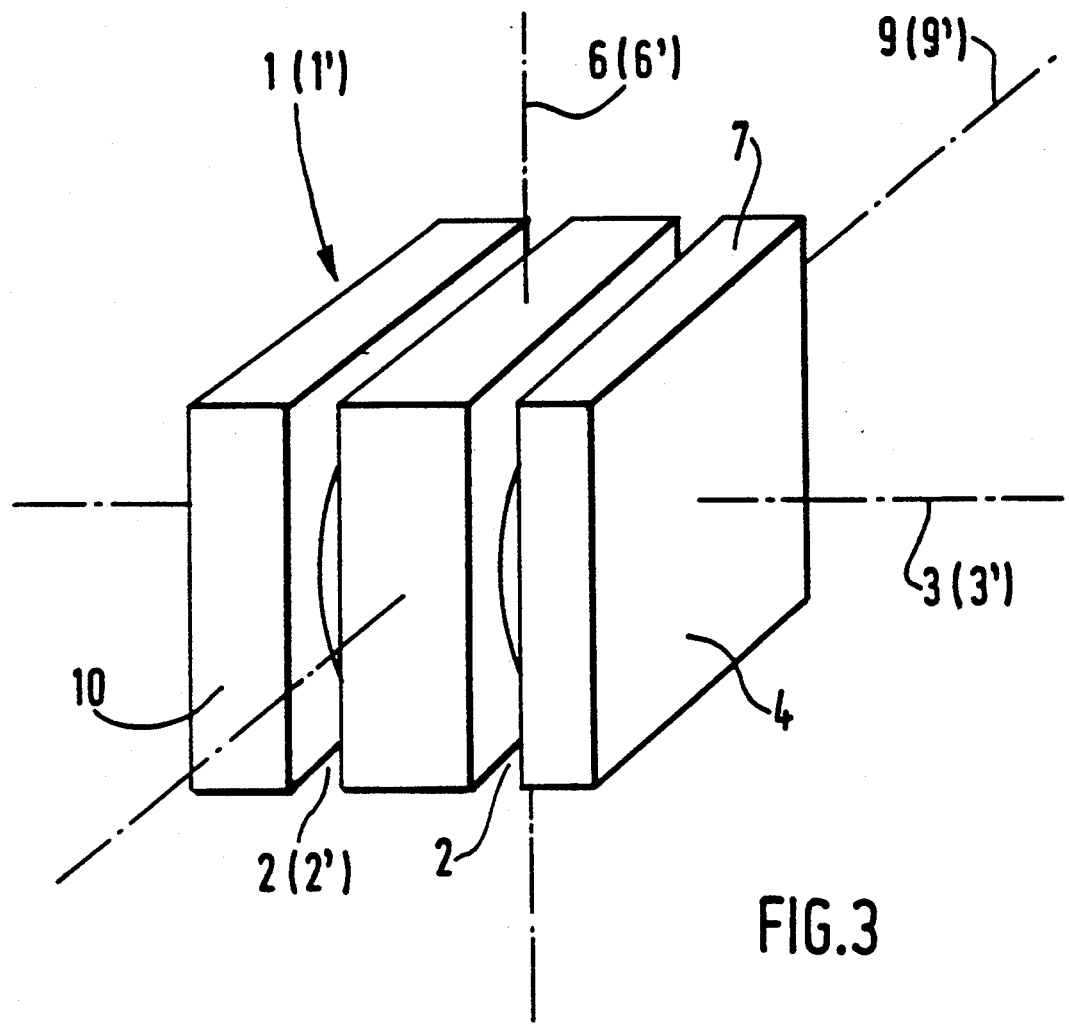
FIG. 3 is a perspective view of the preferred embodiment of the radiator of the invention.

The cube 1 comprises a third pair of grooves 8, which are spaced along a third axis 9, which is perpendicular to the axes 3, 6, the medial planes of the grooves 8 and the face 10 of the cube and which passes through the centre of the cube. The grooves 8 are symmetrical with respect to the plane of symmetry 11 of the cube. For the sake of clarity, the grooves 5, 8 are not shown in FIG. 3. The half view of FIG. 4, from one side of the plane of symmetry 11 of the cube perpendicular to the axis 9, is sectioned along a plane passing through one of the grooves 5 and perpendicular to the axis 6. The plane of symmetry 12 of the cube perpendicular to the axis 3 is shown in FIG. 4.

Pairs of coils were coiled in the pairs of grooves disposed in this way. The first to be dealt with were the deepest grooves 8 without going beyond the base of the grooves 5, with the coils 14, followed by the grooves 5, without going beyond the base of the grooves 2, with the coils not shown for reasons of clarity, and finally the grooves 2 with the coils 13.

In each groove of a pair of associated grooves, the radius of the middle turn is equal to the distance between the medial planes of the two grooves in question.

It should be noted that it would have been possible to proceed in a similar manner using a sphere instead of a cube.

Special Embodiment of the Radiator

|  | ϕ min | ϕ max | space | width | n turns |
| --- | --- | --- | --- | --- | --- |
| axis 3 | 27 mm | 28.4 mm | 9.2 mm | 5 mm | 155 |
| axis 6 | 21.5 mm | 26.5 mm | 9 mm | 3 mm | 170 |
| axis 9 | 15 mm | 21 mm | 6 mm | 3 mm | 216 |

The above table gives the characteristics of the windings made in the grooves of the axes 3, 6, 9 recessed in a cube having a 30 mm edge.

It will be noted that the grooves of the windings are grooves having, in this case, an annular section perpendicular to their axis.

ϕ min is in this case the diameter of the smallest turn and ϕ max is the largest diameter. The space is that which separates the two grooves. The width is that of the grooves. The average radius of associated windings is substantially equal to the sum of the space and the two groove half widths. It should be noted that the windings comprise in this case a number of turns such that their inductance is identical and equal to 1,010 mH. The error curves of FIGS. 5-10 have been plotted for distances from the centre of the radiator of 0.2 m, 0.4 m and 0.6 m along the axes of the coils. It can be seen that at distances of 0.4 or 0.6 m, the errors of the field modulus are very small.

The sensor of the invention is formed in a manner which is very similar to that of the radiator, with one exception. The coils of the axis corresponding to axis 9, thus the smallest coils, are so small and close to one another in a single groove that they form a single coil. For this virtual pair of coils, the Helmholtz conditions are nevertheless met on the level of the two middle turns of the combined coils.

Special Embodiment of the Sensor

The symbols relating to the radiator have been used for the sensor with the same meaning. Thus, the sensor is made using a cube 1', in which are recessed a groove 8' and two pairs of grooves 5', 2' of orthogonal reception axes 9', 6', 3' respectively.

|         | ⌀ min | ⌀ max | space  | width |
|---------|-------|-------|--------|-------|
| axis 3' | 11 mm | 13 mm | 4 mm   | 2 mm  |
| axis 6' | 8 mm  | 10 mm | 2.5 mm | 2 mm  |
| axis 9' | 4 mm  | 7 mm  |        | 5 mm  |

Figure 11:
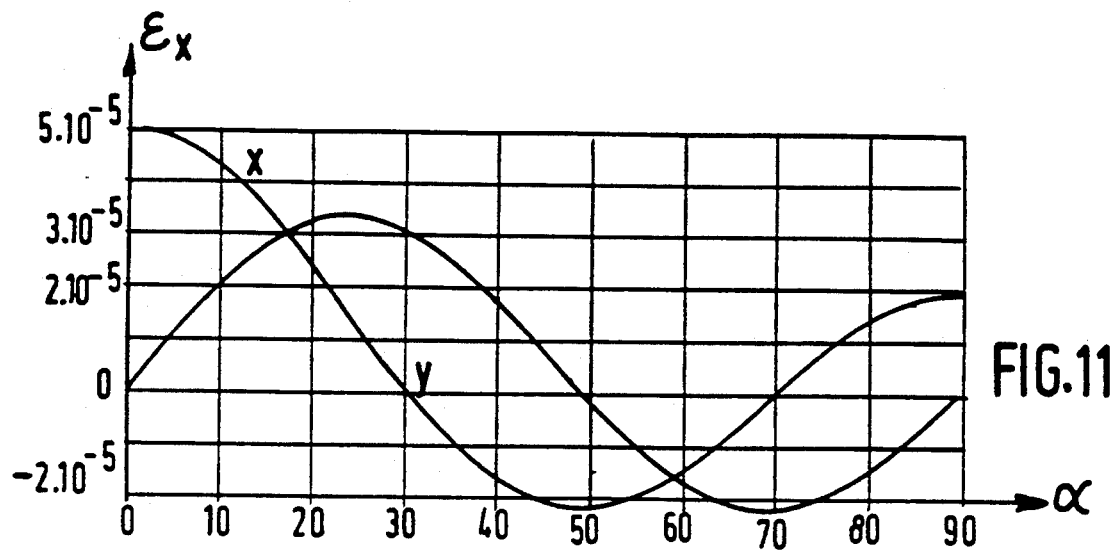
FIG. 11 shows the curves representing the relative error of the field modulus at a predetermined distance as a function of the relative bearing, produced by the double coil of the Ox axis, along the Ox and Oy axes respectively of the sensor of the invention, in relation to the field of a dipole.
Figure 12:
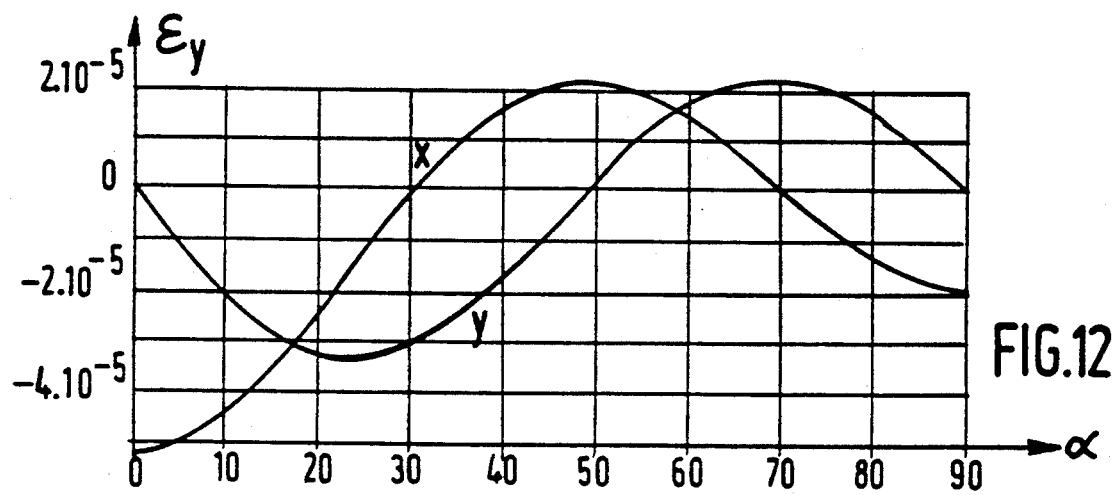
FIG. 12 shows the curves representing the error of the field modulus at a predetermined distance as a function of the relative bearing, produced by the pair of coils of the Oy axis along the Oy and Ox axes of the sensor of the invention in relation to the field of a dipole.
Figure 13:
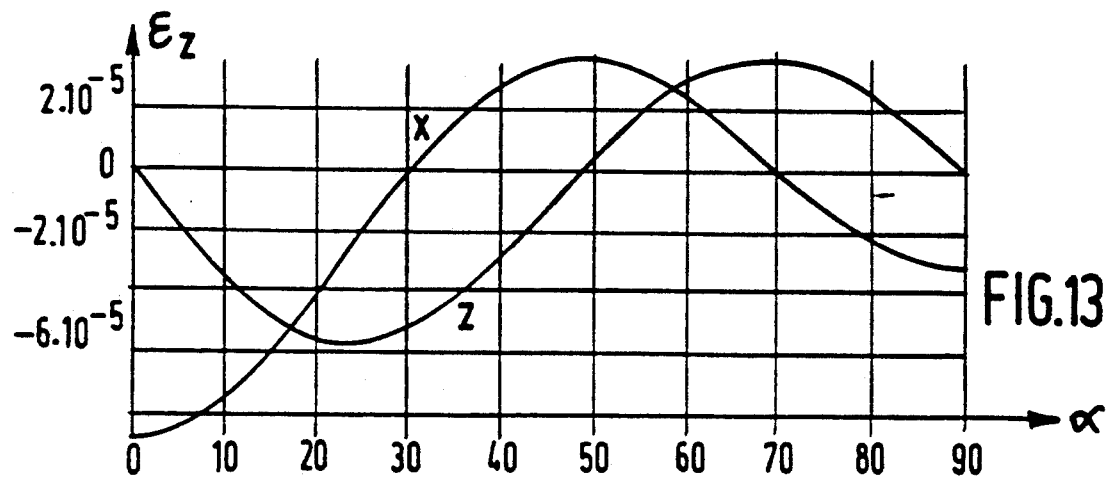
FIG. 13 shows the curves representing the error of the field modulus at a predetermined distance as a function of the relative bearing, produced by the pair of coils of the Oz axis along the Oz and Ox axes of the sensor of the invention, in relation to the field of a dipole.

The error curves of FIGS. 11-13 were plotted for a distance from the centre of the sensor of 0.2 m along the axes Ox, Oy (X,Y), Oy, Ox (Y,X) and Oz, Ox (Z,X) respectively.

I claim:

1. A radiator for transmitting a magnetic field to determine object position and orientation, comprising:
   (a) a support having mutually orthogonal first and second axes of symmetry;
   (b) a first pair of Helmholtz coils mounted on the support along the first axis;
   (c) a second pair of Helmholtz coils mounted on the support along the second axis; and
   (d) each pair of Helmholtz coils including a substantially equal number of generally circular turns to provide a substantially equal thickness for a respective pair, each respective number of turns having a substantially equal average turn radius and turn diameter, each respective thickness being smaller than a respective turn diameter, each pair of Helmholtz coils being arranged in generally mutually parallel planes spaced apart of each other along a respective first axis and second axis by an axial distance substantially equal to the respective average turn radius.

2. The radiator according to claim 1, wherein the support has a third axis of symmetry mutually orthogonal to both said first and second axes; and further comprising a third pair of Helmholtz coils mounted on the support and being spaced apart of each other along the third axis.

3. The radiator according to claim 2, wherein the support is a cube of non-magnetic material.

4. The radiator according to claim 2, wherein the support has a first pair of grooves in which the first pair of Helmholtz coils are received, and a second pair of grooves in which the second pair of Helmholtz coils are received, and a third pair of grooves in which the third pair of Helmholtz coils are received.

5. The radiator according to claim 4, wherein each pair of grooves has a depth, and wherein the respective pairs of grooves have different depths.

6. The radiator according to claim 4, wherein each pair of Helmholtz coils and each pair of grooves are symmetrically arranged relative to a respective axis of symmetry.

7. The radiator according to claim 4, wherein each pair of Helmholtz coils is completely contained within a respective pair of grooves.

8. A sensor for receiving a magnetic field to determine object position and orientation, comprising:
   (a) a support having mutually orthogonal first and second axes of symmetry;
   (b) a first pair of Helmholtz coils mounted on the support along the first axis;
   (c) a second pair of Helmholtz coils mounted on the support along the second axis; and
   (d) each pair of Helmholtz coils including a substantially equal number of generally circular turns to provide a substantially equal thickness for a respective pair, each respective number of turns having a substantially equal average turn radius and turn diameter, each respective thickness being smaller than a respective turn diameter, each pair of Helmholtz coils being arranged in generally mutually parallel planes spaced apart of each other along a respective first axis and second axis by an axial distance substantially equal to the respective average turn radius.

9. The sensor according to claim 8, wherein the support has a third axis of symmetry mutually orthogonal to both said first and second axes; and further comprising a third pair of Helmholtz coils mounted on the support and being spaced apart of each other along the third axis.

10. The sensor according to claim 9, wherein the support is a cube of non-magnetic material.

11. The sensor according to claim 9, wherein the support has a first pair of grooves in which the first pair of Helmholtz coils are received, and a second pair of grooves in which the second pair of Helmholtz coils are received, and a third pair of grooves in which the third pair of Helmholtz coils are received.

12. The sensor according to claim 11, wherein each pair of grooves has a depth, and wherein the respective pairs of grooves have different depths.

13. The sensor according to claim 11, wherein each pair of Helmholtz coils and each pair of grooves are symmetrically arranged relative to a respective axis of symmetry.

14. The sensor according to claim 11, wherein each pair of Helmholtz coils is completely contained within a respective pair of grooves.

15. An arrangement for determining object position and orientation, comprising:
   (a) a radiator for transmitting a magnetic field toward an object whose position and orientation are to be determined, said radiator including
      (i) a radiator support having mutually orthogonal, first and second axes of symmetry,
      (ii) a first pair of Helmholtz coils mounted on the radiator support along the first axis, and
      (iii) a second pair of Helmholtz coils mounted on the radiator support along the second axis;
   (b) a sensor on the object for receiving the transmitted magnetic field, said sensor including (i) a sensor support having mutually orthogonal, third and fourth axes of symmetry,
(ii) a third pair of Helmholtz coils mounted on the sensor support along the third axis, and
(iii) a fourth pair of Helmholtz coils mounted on the sensor support along the fourth axis; and
(c) each pair of Helmholtz coils including a substantially equal number of generally circular turns to provide a substantially equal thickness for a respective pair, each respective number of turns having a substantially equal average turn radius and turn diameter, each respective thickness being smaller than a respective turn diameter, each pair of Helmholtz coils being arranged in generally mutually parallel planes spaced apart of each other along a respective axis on a respective support by an axial distance substantially equal to the respective average turn radius.

* * * * *